United States Patent [19]
Martin

[11] Patent Number: 5,323,227
[45] Date of Patent: Jun. 21, 1994

[54] QUAD GAIN RING LASER GYROSCOPE WITH INDEPENDENT GAIN REGIONS

[75] Inventor: Graham J. Martin, Canoga Park, Calif.

[73] Assignee: Litton Systems, Inc., Beverly Hills, Calif.

[21] Appl. No.: 288,703

[22] Filed: Nov. 14, 1988

[51] Int. Cl.⁵ .................... G01B 9/02; H01S 3/083
[52] U.S. Cl. .................... 356/350; 372/32; 372/94
[58] Field of Search .......... 356/350; 372/20, 23, 372/32, 94

[56] References Cited

U.S. PATENT DOCUMENTS

| | | | |
|---|---|---|---|
| 3,411,849 | 11/1968 | Aronowitz | 372/94 X |
| 4,329,057 | 5/1982 | Zampiello | 356/350 |
| 4,482,249 | 11/1984 | Smith, Jr. et al. | 356/350 |
| 4,813,774 | 3/1989 | Dorschner et al. | 356/350 X |

Primary Examiner—Stephen C. Buczinski
Attorney, Agent, or Firm—Elliott N. Kramsky

[57] ABSTRACT

A ring laser gyroscope having four independent gain regions each of which drives only one of four modes lasing within the cavity. A non-planar cavity of four intersecting segments of equal lengths is formed within a frame. Versions are disclosed for exciting plasmas therein by both d.c. and r.f. means. By selectively applying localized magnetic fields of differential strengths (by means of both permanent and electro-magnets) to the four gain regions in the cavity, gain curves having distinct, substantially non-overlapping peaks driving different polarization helicities are caused to be generated therein. Circuitry permits one to adjust the locations of the peaks of the gain curves within each of the segments in frequency to coincide with preselected resonant cavity modes. The device permits four mode multioscillator operation free from the harmful effects of mode competition inasmuch as each lasing cavity mode derives gain substantially from only one gain peak.

29 Claims, 5 Drawing Sheets

QUAD GAIN RING LASER GYROSCOPE WITH INDEPENDENT GAIN REGIONS

The U.S. Government has a paid-up license of this invention and the right in limited circumstances to require the patent owner to license others on reasonable terms as provided by the terms of Contract No. DASG60-90-C-0162 awarded by the Department of the Navy.

BACKGROUND

1. Field of the Invention

The present invention relates to rotation sensors. More particularly, this invention pertains to an improved ring laser gyroscope.

2. Description of the Prior Art

The ring laser gyroscope is a rotation sensor that senses rotation about an axis that is perpendicular to the plane of a cavity formed within a frame, preferably of glass ceramic or other low thermal coefficient material. Beams of laser light circulate in opposite directions within the cavity. In accordance with the well-known Sagnac effect, the frequencies of the two beams are altered in opposite senses (that is, one is increased while the other is decreased) by rotation about the axis and the beat frequency between the two beams then provides a measure of rotation.

Lasing is effected within the cavity by the interaction of photons with an excited medium which acts as an amplifier. In a d.c. configuration, the medium is excited by the interaction of a fill gas, typically HeNe, with flows of electrical current between electrodes arranged about or within the gyro frame. Alternatively, in an r.f. actuated device, the medium is excited by means of an electromagnetic field that oscillates at radio frequencies. Only two counterrotating lasing modes need to be supported within the ring laser cavity to obtain a measure of rotation. In a planar cavity, the counterrotating beams are linearly polarized whereas a nonplanar cavity can support both right and left circularly-polarized modes.

The (gain v. frequency) profile of an excited gain medium formed within a cavity is subject to a line broadening effect that reflects the Doppler shifts that occur as a result of the gas atoms moving in the gain medium. As a consequence, the width of the "gain curve" is considerably broader than the natural line width of the Ne transition that is responsible for the 6328 A line and exhibits a bell shape as a result of the Gaussian distribution of the velocities of the gas atoms.

The modes that will resonate, or lase, within a cavity in the presence of a sustaining gain medium are determined by the cavity's geometry. In general, a planar cavity with dielectric mirrors will support only linearly polarized modes while a nonplanar cavity can sustain circularly polarized modes. In the case of a nonplanar cavity, the right and left circularly polarized modes are separated in frequency, an effect known as "reciprocal splitting".

The multioscillator is a type of ring laser gyroscope that is characterized in operation by four lasing modes arranged into two counterpropagating pairs. One of these pairs comprises left circularly polarized light while the other comprises right circularly polarized light. In such a device, the two polarizations are separated in frequency by the reciprocal splitting effect of the (generally non-planar) ring cavity. The frequencies of the clockwise and counterclockwise (or "anti-clockwise") modes are separated in frequency by a nominal amount known as "nonreciprocal splitting". When the device is rotated, such rotation is reflected in equal and opposite changes in the amounts of nonreciprocal splitting between the frequencies of the counterpropagating beam pairs of the right and left circularly polarized modes.

The multioscillator permits one to solve the critical "lock-in" problem by using a d.c. biasing technique without the normal intolerable bias sensitivities associated with drift in the magnitude of the bias. This is accomplished by operating two rotation sensing counterpropagating beam pairs in the cavity simultaneously which are distinguished by their modes of polarization. The applied bias is configured to be equal but opposite between the pairs so that the summed rotational output is independent of any drift. Further, the presence of two frequency differences for deriving rotation provides the user with double the scale factor, and, hence, twice the sensitivity, of a two mode gyroscope. Finally, as is well known in the art, random walk is significantly reduced in the multioscillator, enhancing the reliability of the measurement that is provided by such an instrument.

While a non-planar cavity characteristically supports both left and right circularly polarized modes, the non-reciprocal splitting between counterpropagating beams of the same polarization is conventionally obtained by introducing a Faraday element. The addition of such an element poses a number of drawbacks. These include the fact that they are lossy. Further, the addition of a Faraday element involves costly processes and the resulting device is hampered in regard to nuclear hardening considerations. Commonly-owned pending U.S. patent application Ser. No. 928,069 of Graham John Martin for "Geometrically Biased Ring Laser Gyroscope" teaches the imposition of a magnetic field on the gain medium to suppress two of the four modes that normally lase in a multioscillator-type configuration. The remaining two modes propagate in opposite directions around the cavity and, thus, can provide rotational information. In addition, since the two modes are of orthogonal polarizations they are separated in frequency by an amount that is determined by cavity nonplanarity. Hence, such a configuration effectively achieves nonreciprocal splitting without requiring an intracavity element.

The type of two-mode geometrically biased device described in that patent application has been found to be inadequate for accurate ring laser gyroscope use as a consequence of instabilities in the reciprocal splitting. Such instabilities are related to effects in the dielectric mirrors of the cavity. The reduction from four to two modes in the multioscillator removes the advantageous common mode rejection. This shortcoming is addressed in commonly-owned U.S. patent application Ser. No. 115,018 of Graham John Martin entitled "Split Gain Multimode Ring Laser Gyroscope and Method" that again utilizes a magnetic field applied to the gain medium to suppress certain modes from lasing. In contrast to the former device, four-mode operation is restored by operating across the cavity resonances from two different longitudinal mode sets. In this manner instabilities in the geometrically-induced reciprocal splitting are satisfactorily moved by the common mode rejection provided by the split-gain four-mode configuration. However, at the same time, the latter device removes lock-in without the use of intracavity elements.

While the above patent application teaches a device that does not require the introduction of an undesired intracavity element for operation, the device disclosed in the patent application, like other laser rotation sensors, is subject to operational problems that derive from "sharing" of the excited gain medium by multiple cavity modes. As discussed above, the gain curve characteristic of an excited gain region is subject to a considerable line broadening effect. In a realistic HeNe-filled ring cavity, for example, the cavity mode spacings are generally less than the width of the gain curve.

The sharing of the gain medium introduces harmful mode competition effects. Such effects result from the need for the different modes to "compete" for gain from the same set of gain medium atoms (Ne atoms in the case of a HeNe-filled ring laser). In fact, such effects have limited current practical ring laser gyroscopes to utilizing lasing transitions in atomic neon. In general, mode competition effects prevent the stable operation of two simultaneously-counterpropagating modes; a mix of the $Ne^{20}$ and $Ne^{22}$ isotopes has the fortunate property of allowing sustained lasing with counterpropagating beams. The mode competition effects also cause undesired interactions between the mode frequencies known as "mode pulling" and "mode pushing". Such effects upon the frequencies of the modes are quite disruptive of sensor operation which depends upon rotation-induced changes in the frequencies of such modes for determining the value of angular rate.

SUMMARY

The foregoing and other disadvantages of the prior art are addressed and overcome by the present invention that provides, in a first aspect, an improved multioscillator. Such multioscillator includes a frame that has an internal nonplanar cavity comprising four straight cavity segments. The nonplanar cavity is characterized by right and left circularly polarized resonant modes. A laser gain medium within the cavity is characterized by a gain curve. Means are provided for manipulating the gain medium to split the gain curve into a multiplicity of distinct peaks of gain that do not substantially overlap in frequency space. Such peaks form pairs wherein one component of each of such pairs can drive only cavity polarization modes of positive helicity and the other component can drive modes of negative helicity. Means are also provided for generating a pair of counterrotating beams of laser light within the nonplanar cavity whereby beams of right and left circularly polarized laser light are supported within the cavity. Finally, means are provided for adjusting the peaks of the distinct gain curves in frequency so that one peak of each of the distinct gain curves energizes a selected resonant mode of the cavity.

In a second aspect, this invention provides a method for exciting the four operational modes of a multioscillator of the type that is characterized by a frame having a nonplanar internal cavity comprising four straight cavity segments and means for generating a pair of counterrotating beams of laser light within the nonplanar cavity whereby beams of right and left circularly polarized laser light are supported therein. A laser gain medium that is characterized by a gain curve is applied to the cavity. The gain medium is then manipulated to split the gain curve into a multiplicity of peaks of gain that do not overlap substantially in frequency space. Such peaks form pairs wherein one component of each pair can drive only cavity polarization modes of positive helicity while the other component can drive only modes of negative helicity. Thereafter, the peaks of the distinct gain curves are adjusted in frequency so that one peak of each pair a selected resonant mode of the cavity.

The features and advantages of this invention will become further apparent from the detailed description that follows. This description is accompanied by a set of drawing figures wherein numerals corresponding to those of the description point to the various features of the invention. Like numerals refer to like features throughout both the written description and the drawing figures.

DETAILED DESCRIPTION

Figure 1:
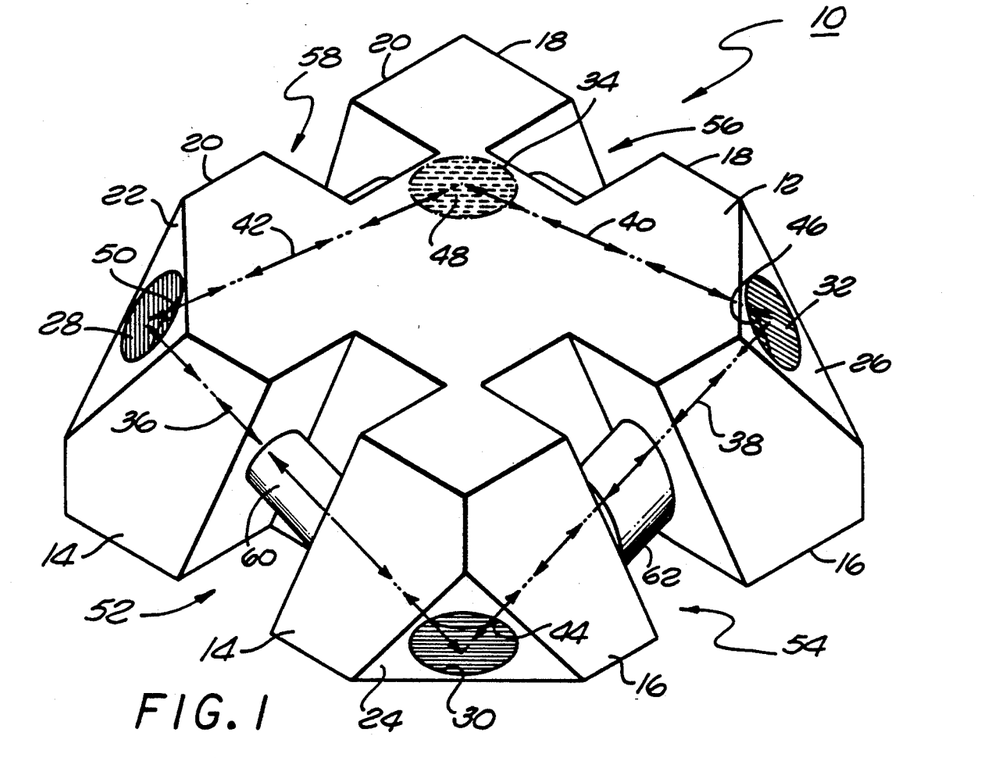
FIG. 1 is a perspective view of an r.f.-excited multioscillator in accordance with the invention.

Turning now to the drawings, FIG. 1 is a perspective view of an r.f.-excited multioscillator 10 in accordance with the invention. The multioscillator 10 includes a machined block or frame 12 of glass ceramic material of low thermal coefficient such as that marketed under the trademarks "Zerodur" and "Cer Vit".

The frame 12 includes planar top and bottom surfaces that are bordered by segmented planar sides perpendicular thereto shown in FIG. 1 at 14, 16, 18 and 20.

The perpendicular sides terminate in angularly-inclined planes, three (of four) of which are shown at 22, 24 and 26 that provide mirror mounting surfaces 28, 30, 32 and 34 as shown in FIG. 1. The four planes that provide such mirror mounting surfaces define a regular tetrahedron when extended.

The frame 12 acts as a means for defining and containing a closed, non-planar cavity wherein beams of light may counterrotate and thereby provide the four modes (right circularly polarized, clockwise and anticlockwise, and left circularly polarized, clockwise and anticlockwise) required for multioscillator operation. The non-planar cavity is defined by four intersecting bores defining light paths 36, 38, 40 and 42, each segment being of equal length. As can be seen, the straight bores that define the non-planar cavity intersect in regions adjacent mirror wells 44, 46, 48 and 50 formed within the frame 12.

Cutout regions 52, 54, 56 and 58 are interior to and act to segment or bifurcate the sides of the frame 12. Each of such cutout regions is angularly-inclined as shown and is traversed by a tube such as that shown at 60 that is machined from the same block of glass ceramic material from which the frame 12 was formed. Each of the four tubes that traverse the cutout regions 52, 54, 56 and 58 of the frame 12 encloses a middle portion of one of the bores 36, 38, 40 and 42 that comprise the non-planar lasing cavity of the device and thereby provides path continuity for the beam of light within that segment. Further, each tube provides an area within the frame 12 for fixing an r.f. exciter magnet assembly 62.

For purposes of clarity, only a single exciter magnet assembly is shown in FIG. 1 despite the fact that four such assemblies are required for proper operation of the r.f. energized device as described below. An assembly is shown in greater detail in, and described in connection with, FIG. 5 below.

Figure 2:
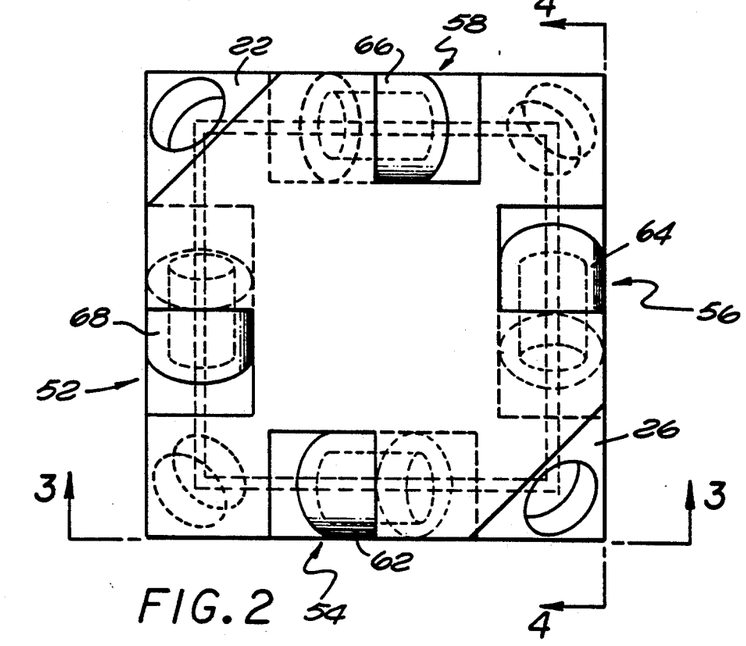
FIG. 2 is a top plan view of the multioscillator of FIG. 1.

FIG. 2 is a top plan view of the r.f.-excited multioscillator 10. As discussed above, the completed device includes four r.f. exciter magnet assemblies 62, 64, 66 and 68 arranged about the outer edge of the frame 12. Each of the assemblies is mounted to a tube, such as the tube 60 of FIG. 1, bridging one of the cutout regions 52, 54, 56 and 58. As can be seen, the non-planar lasing cavity within the frame 12 forms a square shape when viewed from above.

Figure 3:
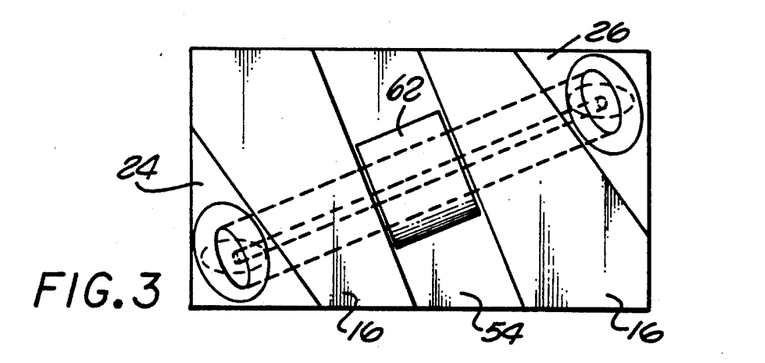
FIGS. 3 and 4 are elevation views of adjacent sides of the multioscillator of FIG. 1.
Figure 4:
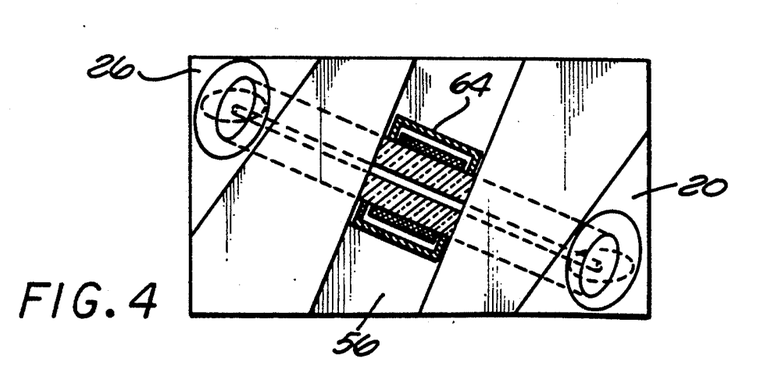

FIGS. 3 and 4 are elevation views of consecutive (adjacent) sides of the device. The two configurations shown in these views are repeated at the remaining, opposed sides. As is seen, the straight bores of the non-planar cavity are substantially surrounded by the r.f. exciter magnet assemblies 62 and 64 when such bores pass through, and are enclosed by, the tubes of the frame 12 that bridge the cutout regions 54 and 56 respectively (same for other sides). As will become apparent from the discussion that follows, that portion of each bore contains substantially all of the excited gain medium generated within the bore. As a consequence, the excited gain medium of each cavity segment comprising the non-planar cavity is thus mutually isolated. As such, one may separately energize the four lasing modes of the cavity with the peaks of distinct gain curves to effect four lasing modes which are unaffected by deleterious mode competition that has significantly limited the usefulness of both four and two mode ring laser devices in the past.

Figure 5:
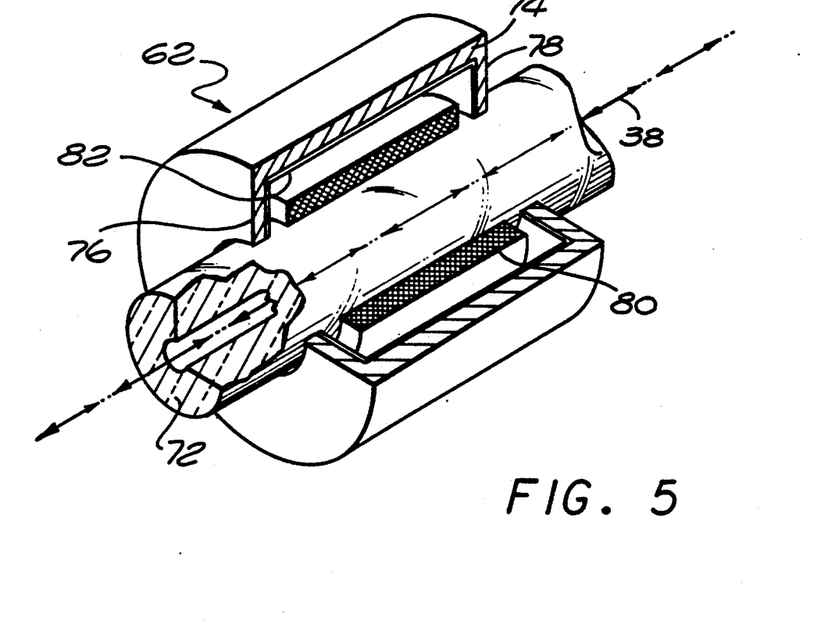
FIG. 5 is a partially-broken perspective view of an r.f exciter/magnet as employed in the present invention to excite the gain regions located within the segments of the lasing cavity of the invention.

FIG. 5 is a perspective view of an r.f. exciter magnet assembly 62 for use in the present invention. Such a device is generally described in pending U.S. patent application Ser. No. 218,405 of Tae Hahn et al. entitled "Radio Frequency Excited Ring Laser Gyroscope". By employing such a device, one may create "independent" substantially homogeneous excited gain media within each of the straight bore segments that, in combination, comprise the nonplanar lasing cavity. The use of such an assembly simplifies design by eliminating the anodes and cathodes that would otherwise be required for excitation. Further, the use of such a device substantially reduces the undesired Fresnel-Fizeau gas flow effects that result from the directionality of current flow in a d.c. device. However, as will be seen, the operation of this invention is not dependent upon an r.f. gain medium. Rather, a d.c. discharge may be employed to excite the gain medium. Such an arrangement is illustrated and discussed below.

As shown in FIG. 5, the r.f. exciter magnet assembly 62 may be fixed to the circumference of a tube 72 of the frame 12. Alternatively, the assembly may be fixed to the walls of the cutout 56. The assembly 62 includes a cylindrical permanent magnet shell 74 with inwardly-directed end flanges 76 and 78 for maximizing the region of uniform axial magnetic field within the tube 72. The design of the cylindrical magnet, which may have stepped internal and external diameters, is designed to provide a uniform magnetic field over the region of the gas discharge. A coil 80 within the shell 74 is wound about the circumference of the tube 72 and a foil layer or coating 82 at the interior of the permanent magnet defines an r.f. cavity resonant to the r.f. energy generated by the coil 80. As mentioned above, the four assemblies 62, 64, 66 and 68 permit independent adjustment of the magnetic fields applied to the gain media in each of the four bores that comprise the non-planar lasing cavity thereby providing independent plasma gain media. A first, "rough" approximation to the "proper" axial magnetic field strength (discussed below) is achieved by judicious choice of the dimensions of the permanent magnet of each assembly. D.c. currents modulated to a small degree at distinct low-frequency rates flow through three of the four assembly exciter coils. The modulations permit servoing of the d.c. current levels and, in combination with cavity length modulation at a fourth, distinct frequency allows precise adjustment of the locations of the gain curve peaks in frequency (i.e. maximum amount of gain as a function of frequency). A system for servoing both the individual trimming coil currents and the overall cavity length is illustrated and described with reference to FIG. 8 below. An r.f. component flows in each of the four exciter coils. While the d.c. component of the coil current "fine tunes" the axial magnetic field of the permanent magnet, the r.f. component (typically 200 MHz) provides discharge within the gain medium by oscillating the gain medium to excitation.

FIGS. 6(a) through 6(d) comprise a series of diagrams for illustrating the operation of the multioscillator of the invention (both r.f. and d.c.-actuated versions). More specifically, the figures illustrate the manner in which a multioscillator arranged in accordance with the present invention overcomes the problems that result from mode competition by providing four independent and separate gain curve "peaks", one of each of such peaks of magnitude of gain being so located in frequency to energize only one of the four modes of the non-planar cavity of the multioscillator.

In operation, the cavity within the multioscillator frame is filled with a gas that has a relatively "narrow" gain curve characteristic. An example of such a gas is atomic xenon (preferably natural) lasing on the $5d[3/2]^0{}_1,-6p[3/2]_1$, atomic transition at 2.0268 microns as described, for example, by Faust et al., *Applied Physics Letters*, vol. 1, no. 4, pgs. 85 through 88. The isotopes of xenon have atomic masses around 130 and lasing transitions (near infrared) at a wavelength of approximately 2 microns whereas those of neon have atomic masses of 20, 21 or 22 and (red line) lasing transitions at a wavelength of 0.6328 microns. Since Doppler width is proportional to frequency and inversely proportional the square root of atomic mass, the Doppler width of the neon gain curve (1200 to 1300 MHz) is approximately eight (8) times as broad as that of xenon (150 to 200 MHz).

Figure 6A:
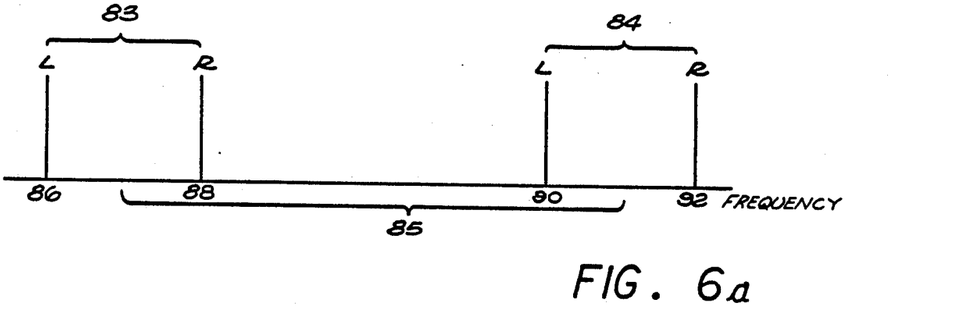
FIGS. 6(a) through 6(d) are a set of diagrams that illustrate the operation of the multioscillator of the invention wherein the four resonant cavity modes are energized by four independent gain media.

As shown in FIG. 6(a), the non-planar cavity of the multisocillator is characterized by recurring sets 83 and 84 of left and right circularly-polarized modes at the frequencies 86 (left circular polarization) and 88 (right circular polarization), 90 (left circular polarization) and 92 (right circular polarization) respectively. The recurring sets of cavity modes are separated in frequency by an amount (dependent upon the geometry of the cavity) indicated at 85 that is commonly designated the cavity "free spectral range" (f.s.r.). Accordingly, the indicated modes can lase within the cavity in the presence of an excited medium.

Figure 6B:
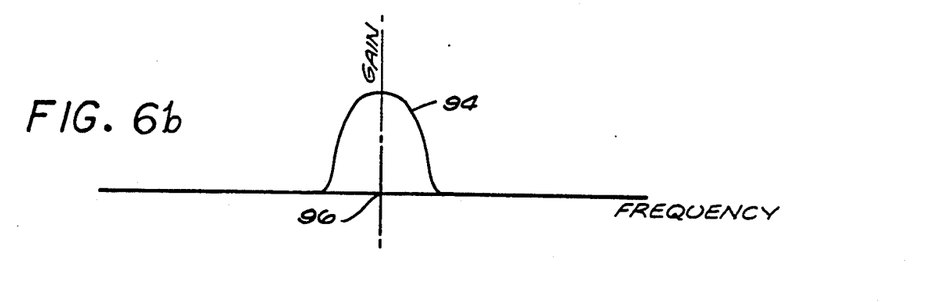

FIG. 6(b) is a graph of the gain curve of the xenon fill gas within the multioscillator cavity. The general shape, and the factors effecting the shape, of the curve 94 have been discussed above. In addition, the relatively narrow width of such curve for xenon as opposed to neon has also been discussed. The center 96 of the gain curve 94 indicates the frequency at which the plasma gain medium provides the maximum excitation and thus the maximum amplification of photons for sustaining lasing within the cavity.

The photons of light within a cavity must be excited by a gain medium to sustain lasing. The above-described apparatus of the multioscillator enables one to sustain each of the four modes (right circular clockwise, right circular anticlockwise, left circular clockwise, left circular anticlockwise) by means of "independent" excited gain medium to thereby avoid the deleterious effects of mode competition that can render either a four mode or a two mode rotation sensor inoperative.

Figure 6C:
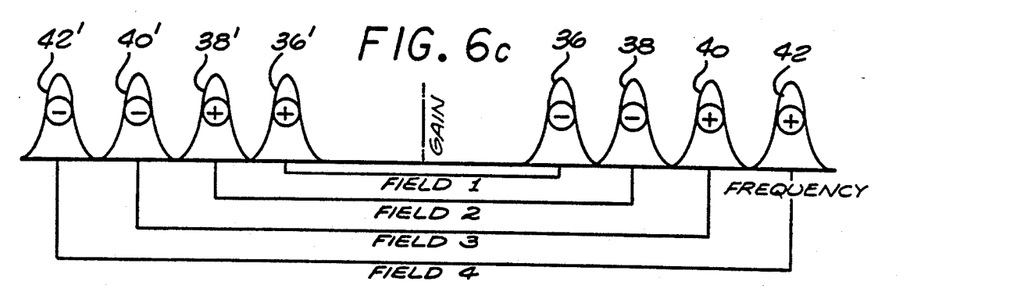

FIG. 6(c) is a diagram that illustrates the effect of the imposition of magnetic fields of differential magnitudes upon the xenon gain medium. As is well-known in the art, the imposition of a magnetic field upon a gain medium splits the gain curve so that, instead of a single peak, two separate gain peaks are created (i.e. maximum magnitude of gain occurs at two different frequencies). The two peak values are displaced in frequency from the peak of the original gain curve by equal and opposite amounts (i.e. "above" and "below" the original maximum value) as a result of the raising of the degeneracy of the magnetic energy levels in the atomic xenon combined with the selection rules in operation which dictate which transitions among the various levels will drive which circular polarizations. The energy level shift for the xenon levels in the presence of a magnetic flux B is given by $\mu_o g_L B$ where $\mu_o$ is a constant known as the Bohr magnetron at $9.274 \times 10^{-21}$ erg/Gauss and the gyromagnetic ratio $g_L$ for the xenon transition in question is 0.82. Thus, the gain curve peak split occurring when the flux is applied is about 2.3 MHz/Gauss.

In the present invention, magnetic fields of four distinct different values are applied to the xenon gas within the four bores comprising the non-planar cavity of the multioscillator 10. As a consequence, the four distinct plasma gain regions created by the r.f. exciters each have two gain peaks equally spaced in frequency from the center of the original gain curve by different amounts. Such gain regions are created by applying magnetic fields of different values with the magnet assemblies that surround the r.f. exciter coils to the xenon fill gas at each of the four tubes of the frame 12. A combination of cavity length control and servoing of d.c. levels within three of the exciter coils locates the gain peaks properly in frequency. The results of the imposition of magnetic fields of differing intensities to the bores of the cavity of the multioscillator are shown in FIG. 6(c). (Note that magnetic field magnitudes shown differ enough so that substantially no overlap exists between the various gain profiles.) Numerals, corresponding to the segments of the cavity light path within the bores of the frame 12, distinguish the split gain curves that are generated within each bore. Primed numerals indicate the "other" lobe that comprises each of the split gain curves. From the preceding discussion of the r.f. multioscillator 10, it can be seen that the relative amounts of splitting of gain curves are attained by applying magnetic fields of successively increasing magnitudes (and reversal of direction because of mirror lateral inversion) with the r.f. exciter magnet assemblies 68, 62, 64 and 66 respectively.

Figure 8:
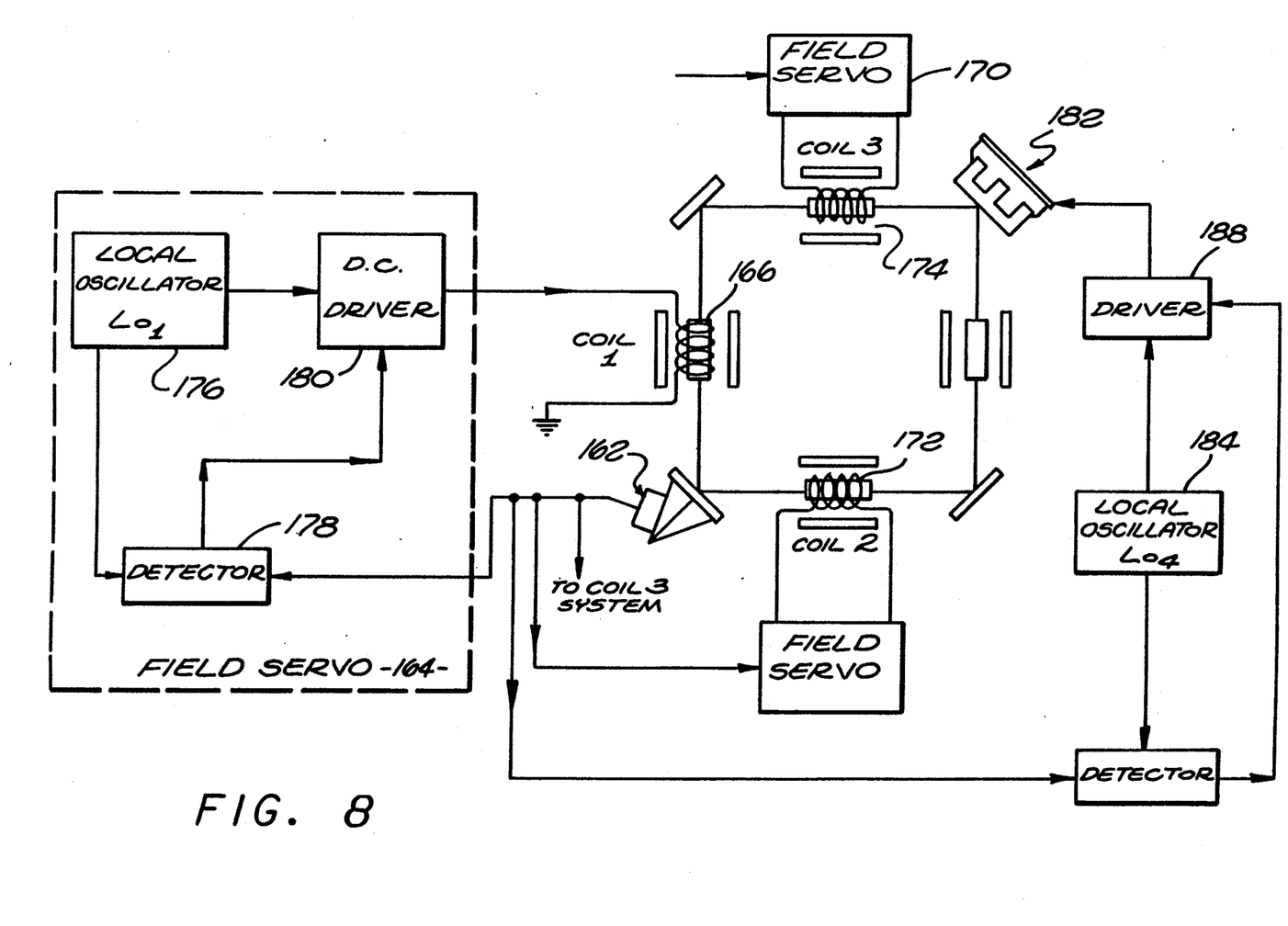
FIG. 8 is a schematic diagram of a system for serving both the individual trimming coil currents and the overall cavity length in accordance with the present invention.

As shown, the peaks of the various split gain curves are adjusted to coincide with resonant modes of the cavity. The reciprocal splitting determined by the cavity nonplanarity is chosen to make this possible. A system for servoing both the individual trimming coil currents and the overall cavity length of the gyro is illustrated in FIG. 8 below. By utilizing such a system, the magnitude of the magnetic field applied to the gain medium in each bore of the cavity can be adjusted with great accuracy. As a result, it is possible to adjust the split gain curves within each of the bores so that a maximum magnitude of gain occurs at each of a number of predetermined resonant cavity modes.

Figure 6D:
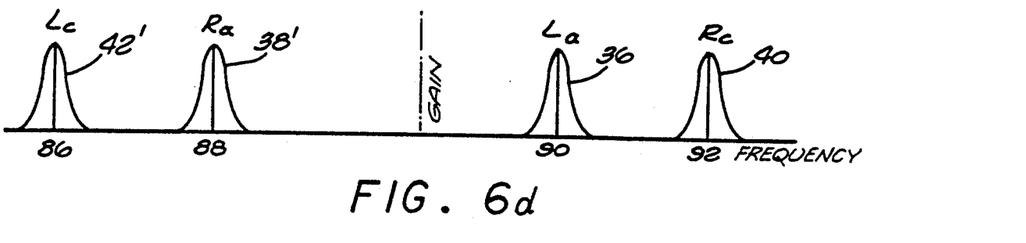

FIG. 6(d) is a continuation of the preceding figure that includes the reciprocally-split resonant modes of the multioscillator cavity in superposition with the magnetically split gain media generated within each of the cavity bores. Each of the pairs of resonant cavity modes of (left and right) circular polarization will tend to lase in both directions in the absence of any magnetic fields applied to the gain medium.

It is well-known in the art that the atomic states creating one half of the split gain curves are such that a single "lobe" can only excite modes of identical helicity. Thus, for example, the lobe 36 of the split gain curve excited within bore 36 can only excite the left circularly polarized anticlockwise and right circularly polarized clockwise modes while the lobe 36' excited within the same bore segment can only excite the left circularly polarized clockwise and right circularly polarized anticlockwise modes. (Lobes or peaks of gain curves are numbered in accordance with the number of the corresponding straight segment of the nonplanar cavity wherein the gain is located.) Since, as seen, only lobe 36 has a peak gain that occurs at a resonant mode of the cavity, and such peak gain coincides with a left circularly polarized cavity mode, only the left circularly polarized anticlockwise mode 90 is energized by the lobe 36 as is shown in FIG. 6(d). (Lobe 36' does not occur at a resonant mode of the cavity and therefore, contributes negligibly to any lasing action. In fact, the gain available at this frequency is considerably reduced by competition from the lasing action at lobe 36).

The directions of the magnetic fields are reversed as one goes sequentially from one r.f. exciter magnet assembly to another about the periphery of the multioscillator frame. As a consequence, the helicities of the modes that are excited by the lobes of the split gain curves are as shown in FIG. 6(c). Such ordering is "true" since the dielectric mirrors located between gain segments reverse the handedness of the impingement circularly polarized light. As such, lobe 38' excites the same helicities as do lobes 36', 40 and 42 while lobes 36, 38, 40' and 42' each excite cavity modes of like helicity (i.e. left circularly polarized clockwise and right circularly polarized anticlockwise modes).

As can be seen, as one proceeds about the multioscillator, the increased gain curve splitting occurring within the various indicated segments comprising the non-planar cavity cause the right circularly polarized anticlockwise mode 88 to be excited by the lobe 38' of the gain medium within the segment 38 (the gain of the lobe 38 being reduced by mode competition effects), the right circularly polarized clockwise mode 92 to be excited by the lobe 40 of the gain medium within the segment 40 (gain of the lobe 40' reduced by mode competition) and the left circularly polarized clockwise mode 86 to be excited by the lobe 42' of the gain medium within the segment 42 (gain of the lobe 42 reduced by mode competition).

By observing the patterns of FIGS. 6(c) and 6(d), one can see that each of the four modes of the cavity within the multioscillator is excited by a gain curve that is substantially independent of the gain exciting the other cavity modes. Thus, the modes are stable and not susceptible to the effects of mode competition that have hampered the operation of multiple mode devices in the past. It should be noted that this configuration is attained as the Doppler widths of the gain curves are appreciably smaller than the lasing mode separations so that gain contributions in the "tails" of unused lobes are negligible.

As can be seen from the above discussion, it is essential to the operation of the invention to appropriately position the gain peaks of the lasing medium within the nonplanar cavity. That is, one must locate preselected peaks at desired resonant cavity modes. A system for servoing both the individual trimming coil currents and the overall cavity length to attain the desired precise location of the gain peaks is illustrated schematically in FIG. 8. Since each lasing mode of the multioscillator draws power from its own gain curve and optimum operation is attained when the mode lasing frequencies are at the curve peaks where there is no gain medium dispersion the system or circuit of FIG. 8 operates to modulate the peak position of three of the gain curves by utilizing the trimming currents. The cavity light is modulated to optimize the cavity resonance position underneath the fourth gain curve. Accordingly, the three "necessary" trimming coil currents and the cavity length position can be derived from a single photodiode 162 that monitors the summed output intensity of the four multioscillator lasing modes. (The different signals output from the photodiode 162 are distinguished by distinct modulation frequencies.) The fourth lasing frequency is matched to its gain curve peak by adjustment of cavity length.

The elements that comprise the field servo 164 that controls trimming current for the coil 166 are illustrated in FIG. 8. Similar arrangements are provided for controlling the trimming currents of the coils 172 (field servo 168) and 174 (field servo 170). It will be appreciated that the particular arrangements of the field servos 168 and 170 differ from that of the field servo 164 and for each other as a consequence of the differences in the modulation frequencies of the coil trimming currents.

Referring to the field servo 164, the field modulation is provided at frequency $Lo_1$ by a local oscillator 176. A synchronous detector 178 extracts the portion of the gyro output beam intensity monitored by the photodiode 162 that oscillates at frequency $Lo_1$ and provides a servo error signal to a d.c. current driver 180. This error signal reaches "zero" when the magnitude of the $Lo_1$ frequency component is at a minimum. As a result of the aforementioned operation, the gain curve for the plasma associated with the coil 166 is caused to be peaked at the lasing frequency of the mode that it is energizing. In a similar manner, the two other lasing frequencies and respective gain curve peaks are aligned by using modulation frequencies provided by local oscillators at $Lo_2$ and at $Lo_3$ which differ from $Lo_1$ and from each other to provide switchable discrimination for the corresponding frequency components in the overall gyro output intensity. (The frequencies $Lo_1$, $Lo_2$ and $Lo_3$ are typically up to a few kilohertz.)

The fourth lasing frequency is matched to its gain curve peak by adjusting the overall length of the lasing cavity. Thus, one does not require a trimming coil for the fourth gain region, and also one minimizes the current flowing in the trimming coils as long as the permanent magnets are scaled in magnitude to substantially provide the correct shifts for the gain curve peaks.

The cavity length is modulated at frequency $Lo_4$ that differs from $Lo_1$, $Lo_2$ and $Lo_3$ by a pzt transducer 182 that is associated with a local oscillator 184. As in the case of the field servo systems, a synchronous detector 186 extracts that part of the intensity signal from the photodiode 162 that oscillates at $Lo_4$ and transmits an error signal to a pzt driver 188 whose magnitude is zero when the magnitude of the frequency component at $Lo_4$ is minimal. In this way the overall cavity length is servoed so that the fourth lasing frequency is centered at the peak of its gain curve.

The above-described servo system will maintain all four lasing modes at the peaks of their respective gain curves where there is no mode pulling. Not only are any changes in cavity length compensated but also the effects of changes in any uniform magnetic field around the gyro will be nulled within the excursion allowed by any limits on the currents that can flow in the trimming coils. The latter correction minimizes any necessity for costly magnetic shielding.

The preceding discussion of this invention has focussed upon an a.c. embodiment wherein r.f. exciter assemblies, each including an exciter coil through which an r.f. current flows. As already mentioned, d.c. with superimposed trimming currents fine tune axial magnetic fields provided by toroidal permanent magnets in three of the four segments of the nonplanar cavity while the r.f. component provides discharge within the gain medium by oscillating the xenon atoms to excitation.

As an alternative, the multioscillator of the invention that operates in accordance with the preceding discussion may be configured as a device wherein the gain medium is brought to d.c. excitation. A perspective view of a d.c.-excited multioscillator having four independent gain regions for exciting four cavity modes in accordance with the teachings of FIGS. 6(a) through 6(d) and those of the above-mentioned invention is shown in perspective and in top plan views in FIGS. 7(a) and 7(b) respectively.

As shown, the d.c. multioscillator 100 includes a frame 102 of appropriate low thermal expansion ceramic glass material. As before, a nonplanar cavity 104 comprising four intersecting bores is located within the frame 102. Unlike that of the a.c. device, the frame 102 is configured to accommodate the electrodes including a cathode 106 and anodes 108, 110, 112 and 114 (anodes 112 and 114 and the associated bores are not shown in FIG. 7(a)) required to create d.c. currents within the bores for exciting the four independent gain regions of the cavity 104. The anodes and cathode access bores configuration is such that gas flow effects within the light path are such that well-known Fresnel-Frizeau bias errors are minimized.

Figure 7A:
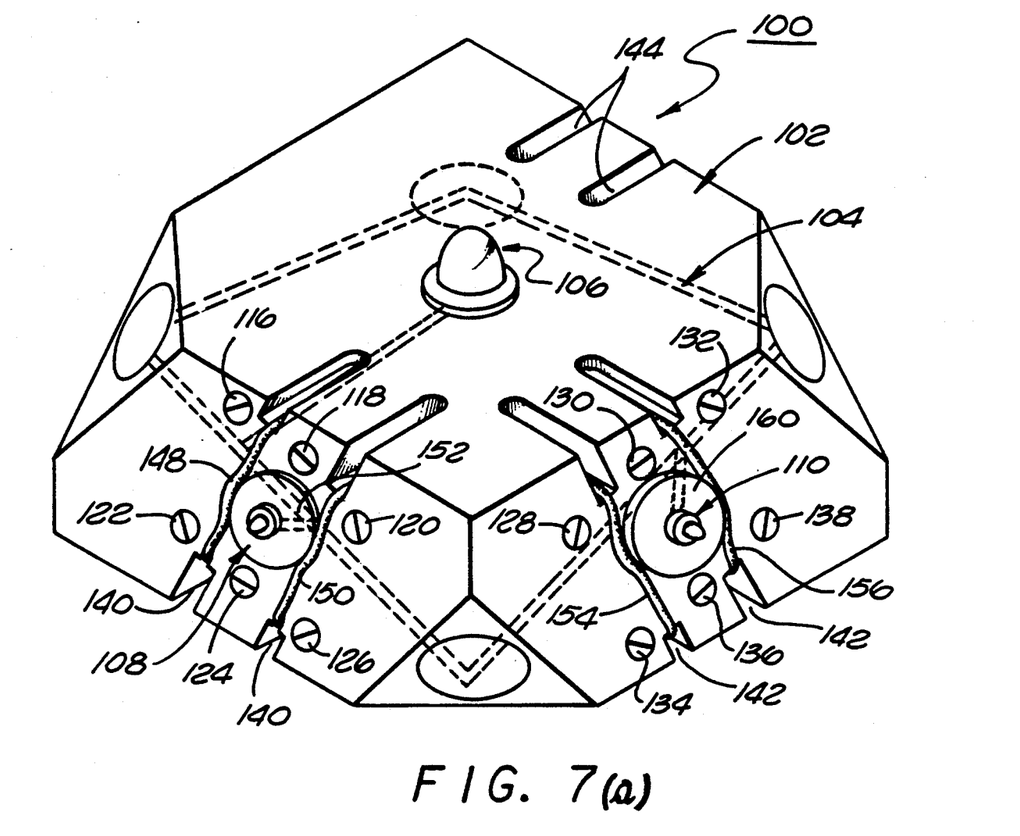
FIGS. 7(a) and 7(b) are perspective and top plan views, respectively, of a d.c.-excited multioscillator in accordance with the present invention.
Figure 7B:
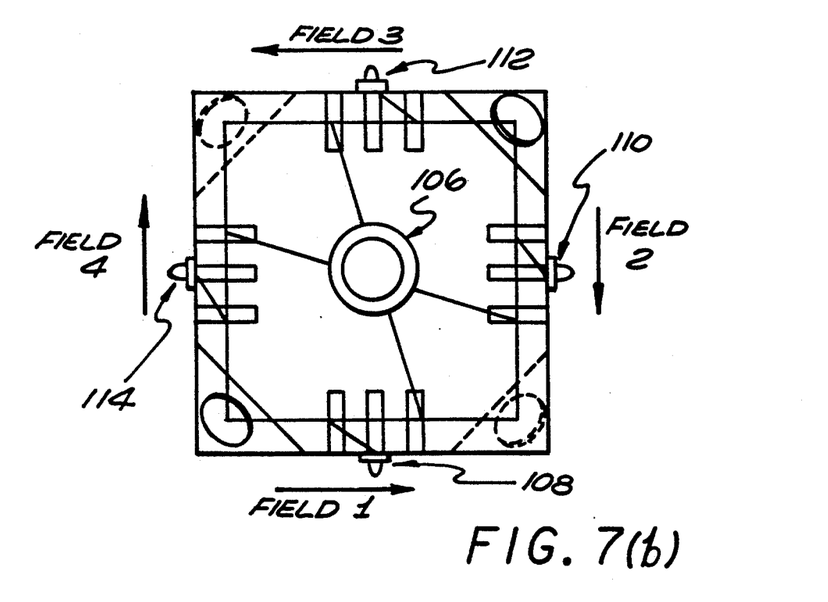

As in the a.c. excited device, four independent gain regions having distinct peak values are formed within the bore segments forming the nonplanar cavity 104 through the application of magnetic fields of differing intensities to each of such segments. While a first, "rough" approximation to the field strength is applied by a permanent magnet of toroidal shape surrounding a tube that bridges a frame cutout in the case of the a.c. embodiment discussed, a first approximation to magnetic field strength is attained in the present case by adjustment of the orientations of permanent dipole magnetic "posts". As shown, groups of six magnetic posts are associated with each of the four bore segments that form the nonplanar cavity 104. The posts of each group are clustered near the middle of each segment and surround the associated anode. For example, the adjustable magnetic posts 116 through 126 surround the anode 108 while posts 128 through 138 surround the anode 110. The orientations of the rods and, consequently, the magnitudes of the magnetic fields imposed upon the associated segments of the nonplanar cavity 104 may be coarsely adjusted by rotating the rods about their long axes.

Each of the magnetic posts has a configuration wherein the north and south magnetic poles are diametrically opposite one another the entire length of the pole whereby a magnetic field arises transverse to the axial length of the magnets. The cylindrical shapes of the posts allow easy coarse tuning of the magnets to position their respectively diametrically opposed north-south poles to achieve an optimum field configuration. The properties of the resultant magnetic fields are discussed in further detail in commonly-assigned U.S. patent application of David B. Hall et al. entitled "Multipole Magnetic Geometry For a Ring Laser Gyroscope" (Attorney's Docket No. 87-39/88-3).

As in the case of the a.c. device, localized and homogeneous magnetic fields must surround the gain media within the associated cavity segments. As mentioned above, the magnetic posts that provide fairly close approximations of the desired magnetic field strength are relatively clustered about the centers of the cavity segments providing uniform magnetic fields only along the portions of the discharge pathways that overlap the optical pathways between the out-of-plane mirrors affixed to the frame 102.

Pairs of grooves 140 through 144 are provided in the surfaces of the frame 102 for insertion of d.c. wire coils on either side of three of the four anode mounts between the posts of the magnetic geometry configuration. For example, d.c. coils 148 and 150 surround anode mount 152 while d.c. coils 154 and 156 surround anode mount 160. (Only three sets of coils must be provided in the d.c. configuration as the servo system of FIG. 8 employs only three trimming currents. Unlike the r.f.-actuated device, the d.c.-version does not require a fourth coil for passing a medium exciting current.)

Each pair of d.c. coils closely approximates a Helmholtz pair configuration which may be use to fine tune the magnetic field produced by sets of magnetic posts uniformly in accordance with the associated servo system of FIG. 8. Thus, the coil pairs 148, 150 and 154, 156 fine tune the fields provided by the magnetic posts 116 through 126 and 128 through 138 respectively. Like field tuning processes also occur with respect to the fields provided in the segments of the cavity 104 associated with one of the the two anodes 112 and 114.

As it is thus evident, the d.c. configuration of the invention illustrated in FIGS. 7(a) and 7(b) provides substantially uniform and tunable flux densities in each of the four segments that comprise the nonplanar cavity 104. As a consequence, it is readily apparent that the same mode of operation illustrated in FIGS. 6(a) through 6(d) and described with reference to the a.c. device may be attained by the present invention when configured as a d.c. device. Further, the frame of the d.c. device is substantially simpler to manufacture than that of the a.c. device, resulting in economies of manufacture.

Thus it is seen that the present invention provides a novel four mode rotation sensor that does not suffer from the effects of mode competition associated with prior art devices. While this invention has been described with reference to its presently preferred embodiments, it is not limited thereto. Rather, this invention is only limited insofar as defined by the following set of claims and includes all equivalents thereof.

What is claimed is:

1. A multioscillator comprising, in combination:
    a) a frame, said formed having an internal nonplanar cavity comprising four straight cavity segments;
    b) said nonplanar cavity being characterized by right and left circularly polarized resonant modes;
    c) a laser gain medium within said cavity, said medium being characterized by a gain curve,
    d) means for manipulating said gain medium to split said gain curve into a multiplicity of distinct peaks of gain that do not substantially overlap in frequency space, said peaks forming pairs wherein one component of each of said pairs can drive only cavity polarization modes of positive helicity and the other component can drive modes of negative helicity;
    e) means for generating a pair of counterrotating beams of laser light within said nonplanar cavity whereby beams of right and left circularly polarized laser light are supported within said cavity; and
    f) means for adjusting the peaks of said distinct gain curves in frequency so that one peak of each of said distinct gain curves energizes a selected resonant mode of said cavity.

2. A multioscillator as defined in claim 1 wherein said means for manipulating said gain medium further includes:
    a) means for imposing substantially uniform d.c. magnetic fields of predetermined differential magnitudes along predetermined portions of said four segments of said nonplanar cavity; and
    b) means for adjusting the magnitudes of said magnetic fields to align said gain curve peaks with the resonant cavity modes.

3. A multioscillator as defined in claim 2 wherein said means for imposing four substantially uniform d.c. magnetic fields includes at least four permanent magnets, each of said magnets being in field proximity to one of said segments of said nonplanar cavity.

4. A multioscillator as defined in claim 3 wherein said means for adjusting the magnitudes of each of the four imposed fields further includes:
    a) four coils, each of said coils being associated with one of said four permanent magnets; and a) means for applying alternating current with a d.c. bias to each of said coils for modulating the positions of said peaks.

5. A multioscillator as defined in claim 4 wherein said means for adjusting the peaks of said distinct gain curves further comprises means for adjusting the d.c. bias applied to each of said coils in accordance with the location of the gain peak of said distinct gain curve in frequency relative to a predetermined resonant mode of said nonplanar cavity.

6. A multioscillator as defined in claim 5 wherein said means for adjusting the peaks of said distinct gain curves further includes means for adjusting the frequencies of the resonant modes of said cavity.

7. A multioscillator as defined in claim 6 wherein said laser gain medium includes xenon gas.

8. A multioscillator as defined in claim 7 wherein said means for adjusting the peaks of said distinct gain curves further comprises means for applying r.f. energy to predetermined portions of each of said four segments of said nonplanar cavity.

9. A multioscillator as defined in claim 8 wherein said frame is further characterized in that:
   a) each of the sides of said frame includes a cutout region;
   b) each of said cutout regions is bridged by a cylindrical tube; and
   c) each of said tubes encloses a portion of one of the segments of said nonplanar cavity.

10. A multioscillator as defined in claim 9 wherein said means for applying r.f. energy to predetermined portions of said segments of said nonplanar cavity additionally includes means for applying said energy to said tubes so that uniform fields of r.f. energy are established substantially within the portions of said cavity segments lying within said tubes.

11. A multioscillator as defined in claim 10 wherein said means for applying r.f. energy to said tubes comprises means for generating resonant fields of r.f. energy surrounding said tubes.

12. A multioscillator as defined in claim 11 wherein said means for generating resonant fields of r.f. energy comprises:
   a) a substantially cylindrical resonant cavity surrounding each of said tubes; and
   b) means for applying r.f. energy to each of said cavities.

13. A multioscillator as defined in claim 12 wherein said means for applying r.f. energy to each of said cavities comprises means for applying r.f. current to each of said coils.

14. A multioscillator as defined in claim 13 further characterized in that:
   a) said means for imposing substantially uniform d.c. magnetic fields comprises four permanent magnets of hollow cylindrical shape; and
   b) each of said substantially cylindrical resonant cavities is located between one of said tubes and one of said permanent magnets.

15. A multioscillator as defined in claim 14 wherein said coil is wound about said tube.

16. A multioscillator as defined in claim 7 wherein said means for adjusting the peaks of said distinct gain curves further comprises:
   a) an anode located at each of the sides of said frame;
   b) a bore within said frame for connecting the interior of said anode to one of the segments of said nonplanar cavity;
   c) a cathode located at the top surface of said frame the locations of said cathode and anodes relative to said segments defining a cavity lasing path;
   d) four bores for connecting the interior of said cathode with each of the segments comprising said nonplanar cavity; and
   e) said anode and cathode bores are located to provide a zero sum net gas flow integrated over the lasing path defined by the position of said cathode and anodes relative to said four segments.

17. A multioscillator as defined in claim 16 further characterized in that each of the sides of said frame includes means for fixing a pair of coils thereto at diametrically opposed sides of said anode.

18. A multioscillator as defined in claim 17 further comprising:
   a) a plurality of rod-shaped permanent magnets;
   b) each of said rod-shaped magnets is located within a side of said frame and oriented substantially normal to said side of said frame so that the north and south poles of said magnets are diametrically opposite along the lengths of said rod-shaped magnets.

19. A multioscillator as defined in claim 18 wherein the position of each of said rod-shaped magnets is adjustable within said frame whereby the orientation of the field imposed by each of said magnets upon a cavity segment can be manipulated.

20. A multioscillator as defined in claim 19 wherein six rod-shaped magnets located within each side of said frame.

21. A multioscillator as defined in claim 20 wherein said magnets are positioned symmetrically about the anode fixed to a side of said frame.

22. A method for exciting the four operational modes of a multioscillator of the type that is characterized by a frame having a nonplanar internal cavity comprising four straight cavity segments and means for generating a pair of counterrotating beams of laser light within said nonplanar cavity whereby beams of right and left circularly polarized laser light are supported therein, said method comprising the steps of:
   a) applying a laser gain medium to said cavity, said gain medium being characterized by a gain curve; then
   b) manipulating said gain medium so that said gain medium is split into a multiplicity of peaks of gain that do not substantially overlap in frequency space and which form pairs such that one component will drive only cavity polarization modes of positive helicity while the other frequency shifted component drives modes of negative helicity; and then
   c) adjusting said peaks in frequency so that one peak of each pair energizes a selected resonant mode of said cavity.

23. A method as defined in claim 22 wherein the step of manipulating the gain medium further includes the steps of:
   a) imposing substantially uniform d.c. magnetic fields of predetermined differential magnitudes along predetermined portions of said four segments of said nonplanar cavity; and then
   b) adjusting the magnitudes of said fields so that said gain curve peaks are aligned in frequency with preselected cavity resonant modes.

24. A method as defined in claim 23 wherein said step of imposing substantially uniform d.c. magnetic fields further includes the step of arranging a permanent magnet in field proximity to each of said four segments of said nonplanar cavity.

25. A method as defined in claim 24 wherein the step of adjusting the magnitudes of said imposed fields further includes the step of modulating the positions of the peaks of said distinct gain curves by applying alternating current with a d.c. bias to a coil.

26. A method as defined in claim 25 wherein the step of adjusting the peaks of said distinct gain curves additionally comprises the step of adjusting the d.c. gain curves additionally comprises the step of adjusting the d.c. bias applied to said coil in accordance with the location of the gain peak of said distinct gain curve in frequency relative to a predetermined resonant mode of said nonplanar cavity.

27. A method as defined in claim 26 wherein the step of adjusting the peaks of said distinct gain curves further includes the step of adjusting the frequencies of the resonant modes of said cavity.

28. A method as defined in claim 27 further including the step of employing xenon gas in said laser gain medium.

29. A method as defined in claim 28 wherein the step of manipulating said gain medium further includes the step of applying r.f. energy to predetermined portions of each of said four segments of said nonplanar cavity.

* * * * *